United States Patent
Karri et al.

(10) Patent No.: US 11,740,726 B2
(45) Date of Patent: Aug. 29, 2023

(54) TOUCH SENSITIVITY MANAGEMENT

(71) Applicant: International Business Machines Corporation, Armonk, NY (US)

(72) Inventors: Venkata Vara Prasad Karri, Visakhapatnam (IN); Saraswathi Sailaja Perumalla, Visakhapatnam (IN); Sarbajit K. Rakshit, Kolkata (IN); Divya Mantha, Vizag (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/194,407

(22) Filed: Mar. 8, 2021

(65) Prior Publication Data
US 2022/0283664 A1    Sep. 8, 2022

(51) Int. Cl.
*G06F 3/041* (2006.01)

(52) U.S. Cl.
CPC .......... *G06F 3/0416* (2013.01); *G06F 3/0418* (2013.01)

(58) Field of Classification Search
CPC .............................. G06F 3/0416; G06F 3/0418
See application file for complete search history.

(56) References Cited

U.S. PATENT DOCUMENTS

| | | | |
|---|---|---|---|
| 8,487,895 B1 * | 7/2013 | Brown | G06F 3/0416 345/173 |
| 9,817,524 B1 | 11/2017 | Christy | |
| 10,152,208 B2 | 12/2018 | Wells et al. | |
| 2001/0014616 A1 * | 8/2001 | Matsuda | H04M 19/04 455/567 |
| 2013/0106710 A1 * | 5/2013 | Ashbrook | G06F 3/0418 345/173 |
| 2013/0187882 A1 * | 7/2013 | Kim | G06F 3/041 345/173 |

(Continued)

FOREIGN PATENT DOCUMENTS

CN    101751179 B    5/2012

OTHER PUBLICATIONS

Anonymous, "Motion Detection in Patient Monitors to Control Touch Screen Operations and Enhanced Alarm Notifications", An IP.com Prior Art Database Technical Disclosure, IP.com No. IPCOM000195157D, IP.com Electronic Publication Date: Apr. 22, 2010, 7 pages.

(Continued)

*Primary Examiner* — Liliana Cerullo
(74) *Attorney, Agent, or Firm* — James L. Olsen

(57) ABSTRACT

A set of touch history data can be received, wherein the set of touch history data indicates a set of unintended touch interactions mapped to contextual data in which each unintended touch interaction occurs. A set of touch sensitivity modification conditions can be determined based on an analysis of the set of touch history data, the set of touch sensitivity modification conditions specifying particular touch modifications to be made under particular conditions. A current touch interaction can be received from a device of a user. The current touch interaction can be analyzed to determine whether a touch sensitivity modification condition of the set of touch sensitivity modification conditions is met. In response to determining that the touch sensitivity modification condition is met, a touch sensitivity of the device of the user can be modified.

14 Claims, 6 Drawing Sheets

(56) References Cited

U.S. PATENT DOCUMENTS

| | | | |
|---|---|---|---|
| 2014/0125620 A1 | 5/2014 | Panther et al. | |
| 2014/0267135 A1* | 9/2014 | Chhabra | G06F 3/04883 345/174 |
| 2015/0355716 A1* | 12/2015 | Balasubramanian | G06F 3/04883 345/173 |
| 2016/0070339 A1* | 3/2016 | Crawford | G06F 3/011 345/156 |
| 2016/0366273 A1* | 12/2016 | Kobayashi | G06F 3/0488 |
| 2017/0357373 A1* | 12/2017 | Kang | G06F 3/03547 |
| 2019/0114005 A1* | 4/2019 | Kies | G06F 3/04883 |
| 2020/0012382 A1 | 1/2020 | Lee | |
| 2020/0310621 A1* | 10/2020 | Piot | G06F 3/04186 |

OTHER PUBLICATIONS

Anonymous, "A Method for Detecting an Unintentional Usage of A Device Based on Analysis of One or More Inputs othe Device", An IP.com Prior Art Database Technical Disclosure, IP.com No. IPCOM000224207D, IP.com Electronic Publication Date: Dec. 13, 2012, 3 pages.

Mell et al., "The NIST Definition of Cloud Computing", Recommendations of the National Institute of Standards and Technology, Sep. 2011, 7 pages.

King, A., "AI-Powered Gesture Recognition as a Mobile Input Method", Aug. 14, 2017, 9 pages.

Alqarni et al., "Identifying smartphone users based on how they interact with their phones", Human-centric Computing and Information Sciences vol. 10, Article No. 7 (2020), Published: Feb. 28, 2020, 25 pages.

* cited by examiner

TOUCH SENSITIVITY MANAGEMENT

BACKGROUND

The present disclosure relates generally to the field of computing, and in particular, to touch sensitivity management.

SUMMARY

Embodiments of the present disclosure include a method, computer program product, and system for touch sensitivity management. A set of touch history data can be received, where the set of touch history data indicates a set of unintended touch interactions mapped to contextual data in which each unintended touch interaction occurs. A set of touch sensitivity modification conditions can be determined based on an analysis of the set of touch history data, the set of touch sensitivity modification conditions specifying particular touch modifications to be made under particular conditions. A current touch interaction can be received from a device of a user. The current touch interaction can be analyzed to determine whether a touch sensitivity modification condition of the set of touch sensitivity modification conditions is met. In response to determining that the touch sensitivity modification condition is met, a touch sensitivity of the device of the user can be modified.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
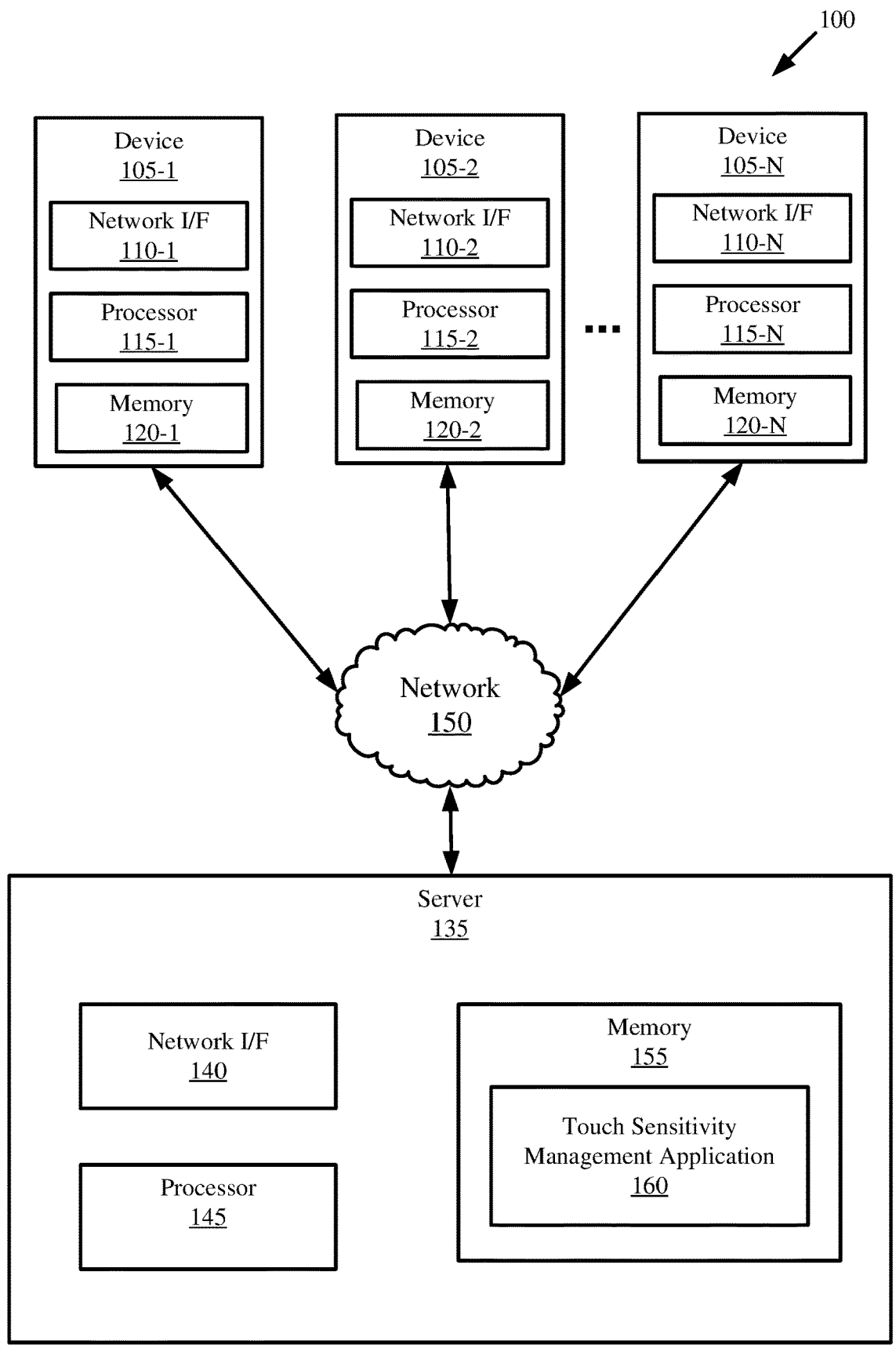
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and in particular, to touch sensitivity management. While the present disclosure is not necessarily limited to such applications, various aspects of the disclosure can be appreciated through a discussion of various examples using this context.

Touch-enabled devices allow users to perform a variety of touch actions on display screens (e.g., touch screens) to facilitate user control. The types of touch actions issued can depend on the pressure applied by the user (e.g., different touch pressures can be mapped to different touch actions based on touch sensitivity), the motion made by the user, or a combination thereof. Users frequently perform unintended touch actions by mistake. For example, a user may apply an incorrect pressure and/or motion to the touch display leading to an unintended touch action being issued. Improving touch-enabled devices to reduce the frequency of unintended touch actions is needed.

Aspects of the present disclosure relate to touch sensitivity management. A set of touch history data can be received, wherein the set of touch history data indicates a set of unintended touch interactions mapped to contextual data in which each unintended touch interaction occurs. A set of touch sensitivity modification conditions can be determined based on an analysis of the set of touch history data, the set of touch sensitivity modification conditions specifying particular touch modifications to be made under particular conditions. A current touch interaction can be received from a device of a user. The current touch interaction can be analyzed to determine whether a touch sensitivity modification condition of the set of touch sensitivity modification conditions is met. In response to determining that the touch sensitivity modification condition is met, a touch sensitivity of the device of the user can be modified.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera, or other input device), and/or any commercially available or custom software (e.g., browser software, communications software, server software, natural language processing software, search engine and/or web crawling software, image processing software, etc.).

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 4.

The server 135 includes a touch sensitivity management application 160. The touch sensitivity management application 160 can be configured to dynamically modify touch sensitivity of a touch-enabled device (e.g., device 105-1) based on contextual data associated with a user of the touch-enabled device.

The touch sensitivity management application 160 can first be configured to collect touch history data (e.g., historical touch data) associated with one or more touch-enabled devices of a user. The touch history data can include a history of unintended touch actions issued by a user mapped to contextual data associated with each respective unintended touch action. The contextual data can, in embodiments, specify time of day, user activity level (e.g., the physical state of the user, such as moving, exercising, or idle), location, brightness, sound level, user attire, temperature, and multi-tasking presence (e.g., driving, reading, etc.), among others, of a user when an unintended touch action occurred. This contextual data can be collected by one or more sensors (e.g., a wearable device, a camera, microphone, etc.) associated with a user's environment.

The touch sensitivity management application 160 can be configured to analyze (e.g., using machine learning (ML) techniques) the unintended touch actions with respect to the contextual data to determine circumstances in which unintended touch actions occur. Thereafter, the touch sensitivity management application 160 can map, based on the analysis, touch sensitivity modifications to particular touch actions in particular contexts (e.g., touch sensitivity modification conditions). By modifying the touch sensitivity of the touch-enabled device under contexts in which unintended touch actions are determined to likely occur (based on analysis of the touch history data), the user can be allowed to issue their intended control despite an unintended touch action. A "touch sensitivity modification condition" refers to a condition (e.g., a particular touch action completed under a particular context) in which a particular touch sensitivity modification is made. The touch sensitivity management application 160 can be configured to associate one or more touch modifications with respective touch modification conditions.

Upon receiving an indication of a current touch action, the touch sensitivity management application 160 can be configured to analyze the current touch action and the user's current context (e.g., the user's activity level, environment, etc.) with respect to touch sensitivity modification conditions. The touch sensitivity management application 160 can then be configured to modify, in response to a touch modification condition being met (e.g., the touch action and context of the user satisfies a touch modification condition), the sensitivity of the touch-enabled device to attempt to reduce unintended touch controls being issued. In embodiments, the sensitivity of the touch screen can either be increased or decreased depending on the specific touch modification condition.

As an example, when a user is physically active (e.g., running), they may be more likely to apply excessive pressure to their device, leading to unintended touch interactions. These unintended touch actions can be stored with the physical activity context within touch history data. Based on an analysis of the touch history data, particular touch actions made by the user (e.g., pressure applications, touch motions, etc.) when physically active can be stored as touch sensitivity modification conditions. In this instance, the touch sensitivity modification conditions can indicate that the sensitivity of the user's device should be decreased in response to observing touch interactions under high physical activity. In this example, if a particular touch action is observed when the user is physically active, a determination can be made that a touch sensitivity modification condition is met, and the sensitivity of the user's device can be decreased, increasing the likelihood that their intended touch control is actually executed.

In embodiments, analysis of the user's current touch interaction (e.g., to determine whether to adjust sensitivity) can be completed during a buffering period prior to executing an action corresponding to the touch interaction. Thus, in embodiments, the touch action executed by the user's current touch interaction may be delayed until a determination can be made that touch sensitivity should or should not be changed.

Modifying "touch sensitivity" can refer to modifying the input touch pressure required for a user to execute a particular touch action. That is, if the touch sensitivity is increased, then a lower input touch pressure by the user may be required to execute a touch action. Similarly, if touch sensitivity is decreased, then a higher input touch pressure by the user may be required to execute the touch action. In embodiments, modifying touch sensitivity may depend on the implemented touch technology. For example, modifying sensitivity can differ for resistive, capacitive, surface acoustic wave (SAW), infrared, optical imaging, and/or acoustic pulse recognition touch screens. In embodiments, modifying touch sensitivity can include a software-based modification of an input pressure mapping to an intended touch action.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary. For example, in embodiments, functionalities of the touch sensitivity management application 160 can be performed by one or more devices 105.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
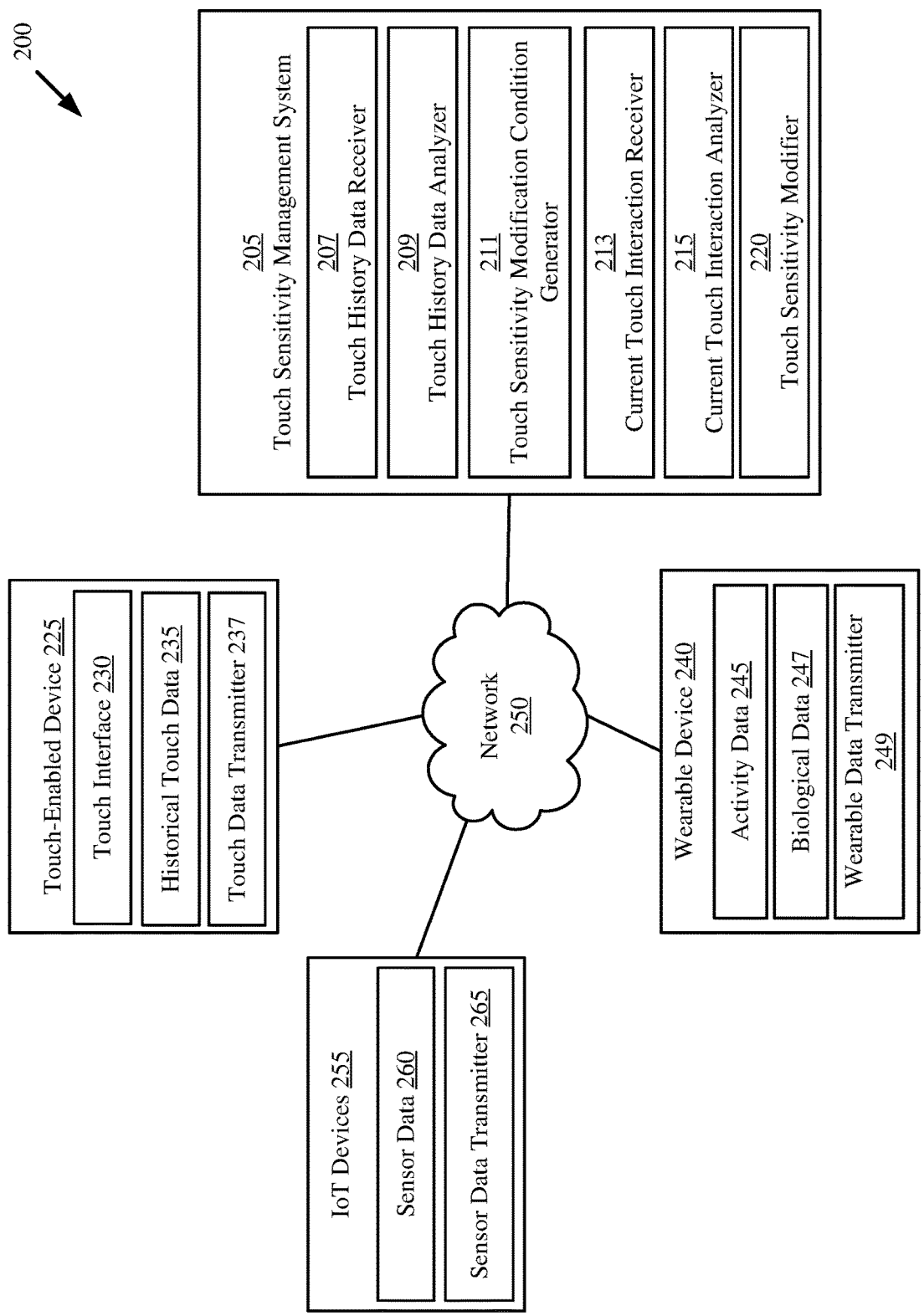
FIG. 2 is a diagram illustrating an example internet of things (IoT) environment in which illustrative embodiments of the present disclosure can be implemented.

Referring now to FIG. 2, illustrated is a block diagram of an example Internet of Things (IoT) environment 200 according to aspects of the present disclosure. The IoT environment 200 can include numerous components communicatively coupled by a network 250, such as, but not limited to, a touch sensitivity management system 205, a touch-enabled device 225, a wearable device 240, and IoT devices 255. The various components within the IoT environment 200 can be processor executable instructions that can be executed by a dedicated or shared processor using received inputs. Further, one or more functionalities performed by the touch sensitivity management system 205 can be performed by other components within the system (e.g., touch-enabled devices 225).

A touch history data receiver 207 can be configured to receive historical touch data 235 from a touch data transmitter 237 of touch-enabled device 225. The historical touch data 235 can include a set of recorded unintended touch interactions, each unintended touch interaction of the set of unintended touch interactions mapping to a respective context in which each unintended touch interaction occurred. The contexts mapped to unintended touch interactions can include, but are not limited to, time of day, user activity level (e.g., running, sitting, exercising, laying, etc.), location, brightness, sound level, biological status (e.g., blood sugar), user attire, temperature, and multi-tasking presence (e.g., driving, reading, etc.), among others. These contexts can be captured by devices associated with the user, which may include, but are not limited to, touch-enabled device 225 (e.g., a camera or microphone on touch-enabled device 225), wearable device 240 (e.g., a wearable device can track user activity level (heart rate, steps taken over time) and biological indicators (blood sugar, sleep data, etc.)), and IoT devices 255 (e.g., surrounding cameras, microphones, and/or appliances in the vicinity of the user).

A touch history data analyzer 209 of the touch sensitivity management system 205 can be configured to analyze the historical touch data 235. The historical touch data 235 can be analyzed to determine touch sensitivity modification conditions. Touch sensitivity modification conditions specify particular conditions (e.g., touch interactions and contexts) that map to particular touch sensitivity modifications. Any suitable analysis method can be completed to derive touch sensitivity modification conditions from touch history data. For example, machine learning and artificial intelligence (AI) based analysis methods can be implemented to determine touch sensitivity modification conditions.

Machine learning algorithms that can be used to determine touch sensitivity modification conditions based on historical touch data 235 can include but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

A touch sensitivity modification condition generator 211 can be configured to generate the touch sensitivity modification conditions determined by the touch history data analyzer 209. For example, a first touch sensitivity modification condition can specify that a first touch interaction (e.g., a first pressure applied to a touch screen) made under a first context (e.g., the user is laying down at nighttime) leads to a first touch sensitivity modification (e.g., an increase in touch sensitivity such that lower pressure can be applied leading to the intended touch action). As another example, a second touch sensitivity modification can specify that a second touch interaction (e.g., a second pressure applied to a touch screen) made under a second context (e.g., a user is physically active during the daytime) leads to a second touch sensitivity modification (e.g., a decrease in touch sensitivity such that higher pressure can be applied leading to the intended touch action).

A current touch interaction receiver 213 of the touch sensitivity management system 205 can be configured to receive a current touch interaction from a touch interface 230 of the touch-enabled device 225. Upon receipt of the current touch interaction, a current touch interaction analyzer 215 can be configured to analyze the type of touch interaction (e.g., the pressure and motion applied) as well as the current context of the user.

The current context of the user can be determined based on analyzing contextual data received from the touch-enabled device 225, wearable device 240, and/or IoT devices 255. As discussed above, contexts of the user which can be received from touch-enabled device 225, wearable device 240, and IoT devices 255 can include, but are not limited to, time of day, user activity level (e.g., running, sitting, exercising, laying, etc.), location, brightness, sound level, biological status (e.g., blood sugar, sleep level, heart rate), user attire (e.g., a winter coat versus a t-shirt), temperature, and multi-tasking presence (e.g., driving, reading, etc.), among others.

For example, wearable device 240 can collect activity data 245 and biological data 247 of the user. The activity data 245 and biological data 247 can be associated with unintended touch interactions within historical touch data 235 and/or used for the purpose of determining whether to modify touch sensitivity based on current touch interactions by the current touch interaction analyzer 215. The activity data 245 can indicate the user's physical activity taken, such as steps taken, speed, distance traveled, and the like. The biological data 247 can indicate the user's heart rate, glucose level, sleep activity, and other data. The contextual data captured by the wearable device 240 can be transmitted to the current touch interaction analyzer 215 for analysis by the wearable data transmitter 249.

The IoT devices 255 can collect sensor data 260 associated with the user. The sensor data 260 can describe the current context of the user and can be associated with unintended touch interactions within historical touch data 235 and/or used for the purpose of determining whether to modify touch sensitivity based on current touch interactions by the current touch interaction analyzer 215. Sensor data can include, but is not limited to global positioning system (GPS) data, time data (e.g., received from a clock), image data (e.g., which can indicate what the user is doing (e.g., walking versus laying, driving versus reading, etc.), the attire of a user, brightness, etc.) audio data, (e.g., which can indicate volume level), and IoT device specific data. IoT device specific data can indicate particular IoT device specific data, such as whether the user has had coffee (e.g., based on a coffee maker IoT device), whether the user has consumed a meal (e.g., based on a refrigerator IoT device), the temperature of the user's dwelling (e.g., based on an IoT temperature sensor), whether the user is currently driving (e.g., based on an IoT vehicle), and other types of IoT device specific data. However, any suitable sensor data can be collected from any suitable sensor and can be associated with unintended touch interactions within historical touch data 235 and/or used for the purpose of determining whether to modify touch sensitivity based on current touch interactions by the current touch interaction analyzer 215. A sensor data transmitter 265 of the IoT devices 255 can be configured to transmit sensor data to the current touch interaction analyzer 215 for analysis.

The current touch interaction analyzer 215 then compares the user's current touch interaction along with the user's context to stored touch sensitivity modification conditions generated by the touch sensitivity modification condition generator 211. The current touch interaction analyzer 215 determines whether one or more touch sensitivity modification conditions are met based on the user's current touch interaction and context. In embodiments, determining whether a touch sensitivity modification condition is met can be completed based on comparison to one or more thresholds (e.g., lower or upper limits). For example, thresholds can be based on contextual data values such as heart rate, temperature, sleep level, speed, steps taken, time, location, and other context data.

If a determination is made that a touch sensitivity modification condition is met, then a touch sensitivity modifier 220 modifies the touch sensitivity of the touch-enabled device 225 as specified by the touch sensitivity modification condition. That is, each touch sensitivity modification condition specifies a particular touch sensitivity modification to be made in response to particular observed conditions. Thus, if a first touch sensitivity modification condition is met specifying a first touch sensitivity modification, then the touch sensitivity modifier 220 modifies the sensitivity of the touch-enabled device 225 according to the first touch sensitivity modification.

In embodiments, the touch sensitivity modifier 220 can modify touch sensitivity for a predetermined time period after the current touch interaction. For example, a touch sensitivity modification condition can specify that touch sensitivity should be altered for a predetermined time period (e.g., 5 minutes) in response to the touch sensitivity modification condition being met. As such, analysis by the touch sensitivity management system 205 may only be required to be completed within predetermined timings and/or upon each new context. Thus, analysis does not necessarily have to be completed upon each current touch interaction.

It is noted that FIG. 2 is intended to depict the representative major components of an example IoT environment 200. In some embodiments, however, individual components can have greater or lesser complexity than as represented in FIG. 2, components other than or in addition to those shown in FIG. 2 can be present, and the number, type, and configuration of such components can vary.

Figure 3:
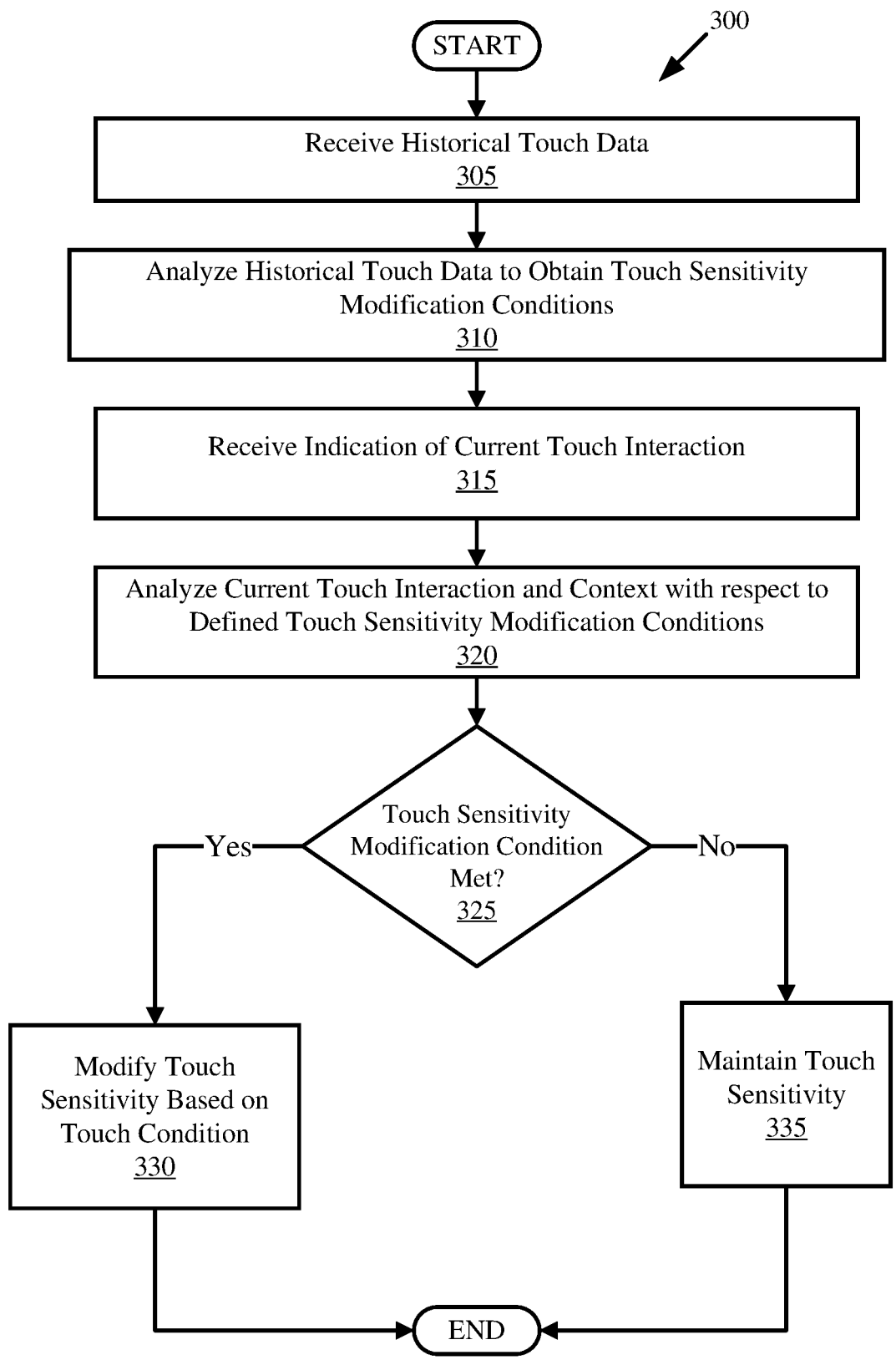
FIG. 3 is a flow-diagram illustrating an example method for touch sensitivity management, in accordance with embodiments of the present disclosure.

Referring now to FIG. 3, shown is a flow diagram of an example method 300 for touch sensitivity management, in accordance with embodiments of the present disclosure. One or more operations of method 300 can be completed by one or more processing circuits (e.g., devices 105, server 135, touch sensitivity management system 205, touch-enabled device 225, etc.).

Method 300 initiates at operation 305, where historical touch data (e.g., touch history data) is received. The historical touch data can be the same as, or substantially similar to, the historical touch data 235 described with respect to FIG. 2. For example, historical touch data 235 can include a set of unintended touch interactions mapped to respective contexts in which each unintended touch interaction occurred.

The historical touch data is then analyzed to obtain a set of touch sensitivity modification conditions. This is illustrated at operation 310. The historical touch data can be analyzed in the same, or a substantially similar manner, as described with respect to the touch history data analyzer 209 of FIG. 2. For example, machine learning techniques can be applied to derive touch sensitivity modification conditions from historical touch data. In embodiments, the touch sensitivity modification conditions can be the same as, or substantially similar to, those described with respect to the touch sensitivity modification condition generator 211 of FIG. 2.

An indication of a current touch interaction is received. This is illustrated at operation 315. The current touch interaction and surrounding context are then analyzed with respect to the defined touch sensitivity modification conditions determined at operation 310. This is illustrated at operation 320. In embodiments, analyzing the current touch interaction and context with respect to defined touch sensitivity modification conditions can include comparison to one or more thresholds and/or a determination whether one or more conditions are met.

A determination is then made whether a touch sensitivity modification condition is met. This is illustrated at operation 325. If a determination is made that a touch sensitivity modification condition is met ("Yes" at operation 325), then the touch sensitivity of the user's device is modified based on the touch sensitivity modification condition. This is illustrated at operation 330. If a determination is made that a touch sensitivity modification condition is not met ("No" at operation 325), then the touch sensitivity is maintained. This is illustrated at operation 335.

The aforementioned operations can be completed in any order and are not limited to those described. Additionally, some, all, or none of the aforementioned operations can be completed, while still remaining within the spirit and scope of the present disclosure.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
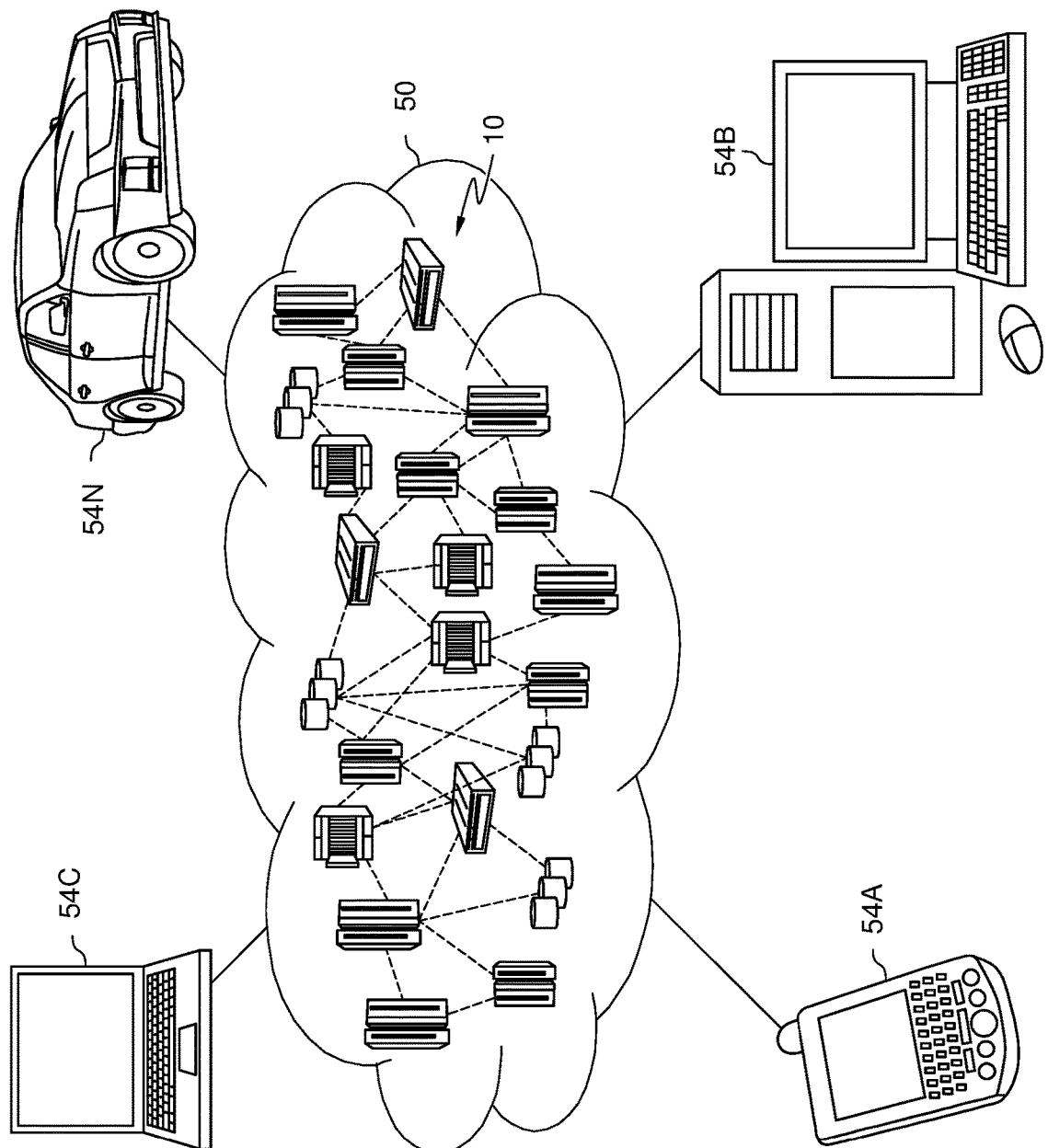
FIG. 4 is a diagram illustrating a cloud computing environment, in accordance with embodiments of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
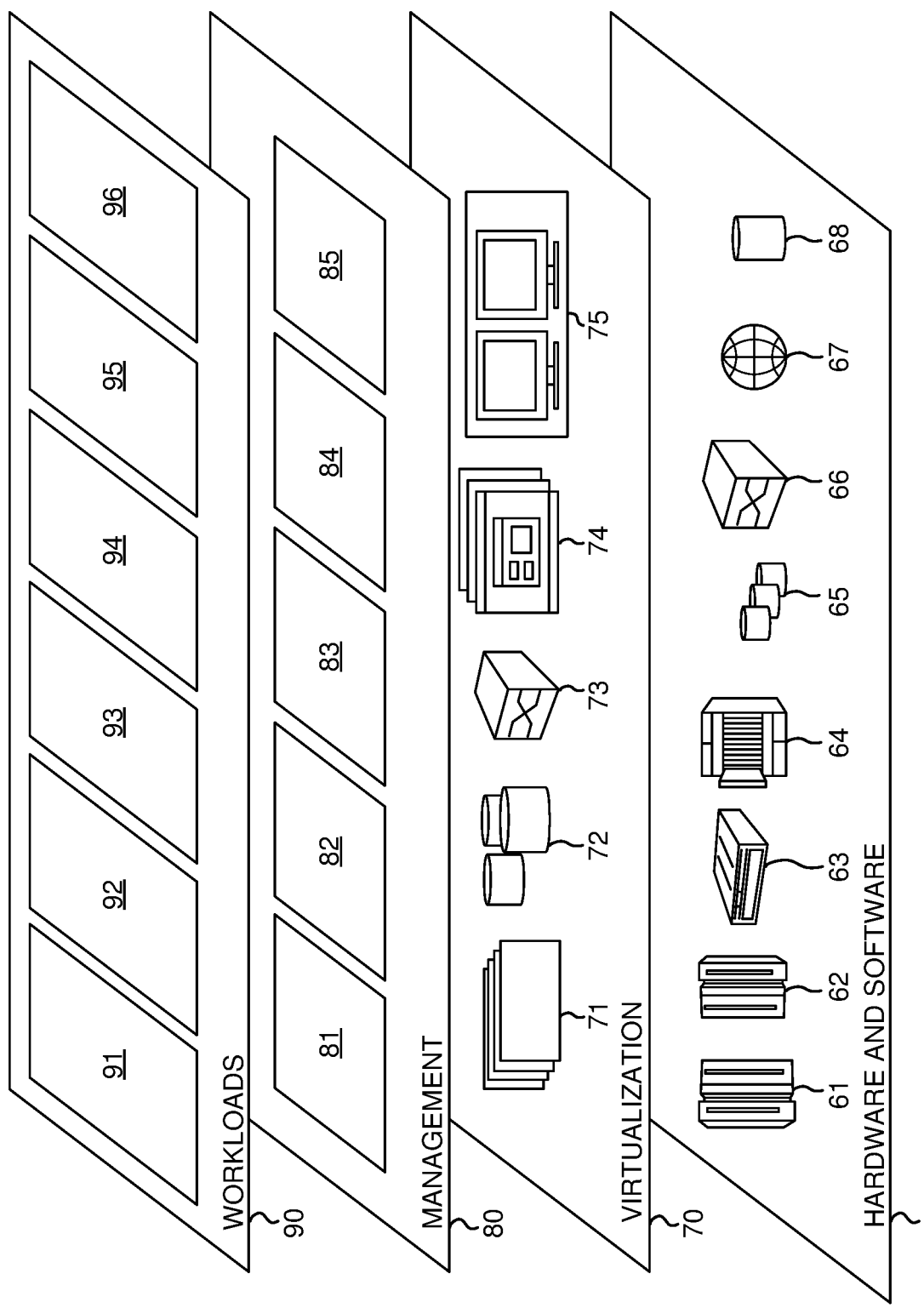
FIG. 5 is a block diagram illustrating abstraction model layers, in accordance with embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and touch sensitivity management 96.

Figure 6:
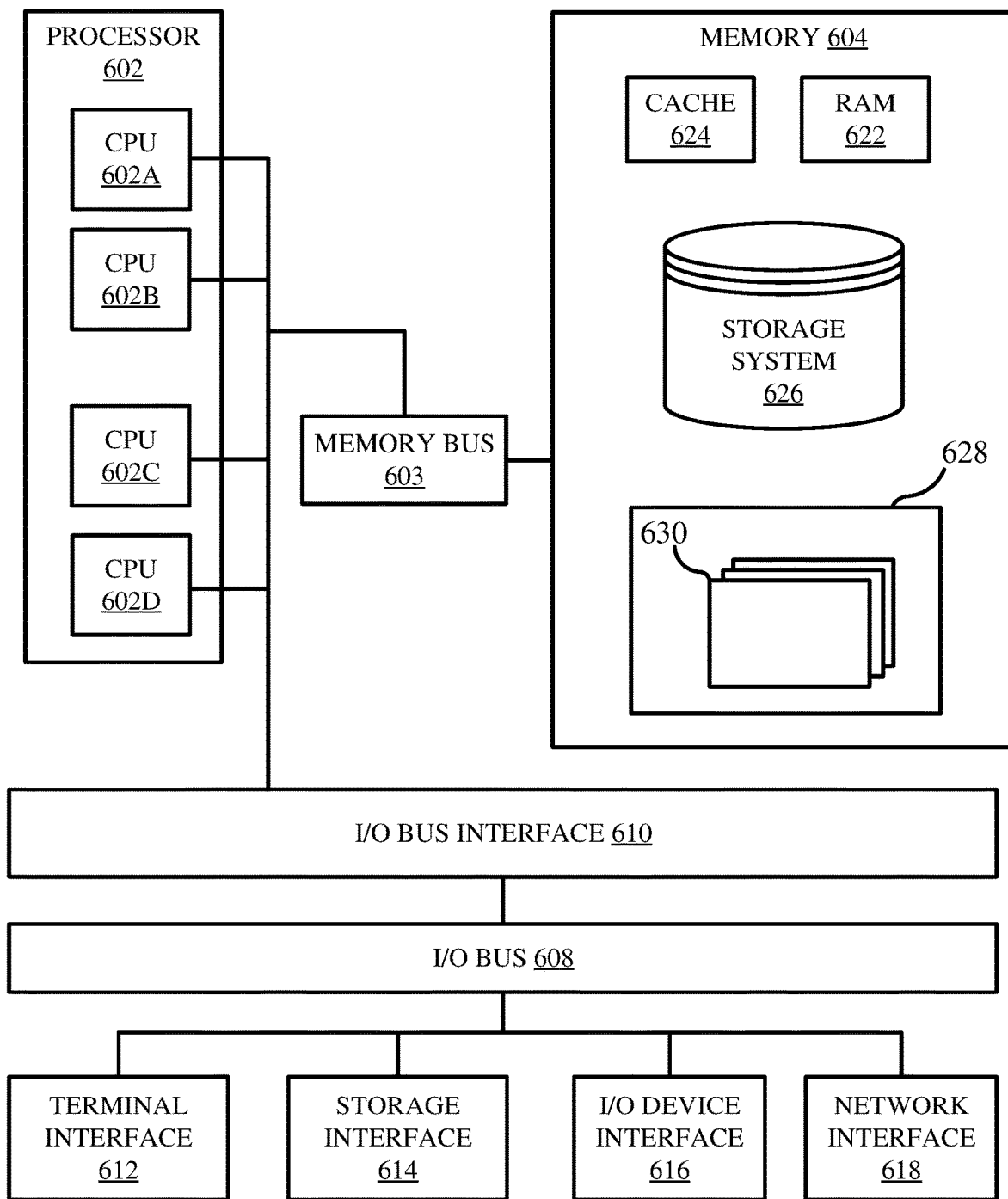
FIG. 6 is a high-level block diagram illustrating an example computer system that may be used in implementing one or more of the methods, tools, and modules, and any related functions, described herein, in accordance with embodiments of the present disclosure.

Referring now to FIG. 6, shown is a high-level block diagram of an example computer system 601 (e.g., devices 105 and server 135) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   receiving a set of touch history data, wherein the set of touch history data indicates a set of unintended touch interactions mapped to contextual data in which each unintended touch interaction occurs;
   determining, based on an analysis of the set of touch history data, a set of touch sensitivity modification conditions, the set of touch sensitivity modification conditions specifying particular touch sensitivity modifications to be made under particular contextual conditions, wherein the set of touch sensitivity modification conditions are determined using a machine learning algorithm based on the set of touch history data;
   receiving a current touch interaction from a device of a user;
   analyzing, during a buffering period after receiving the current touch interaction from the device of the user and before executing a touch action corresponding to the current touch interaction, the current touch interaction to determine whether a touch sensitivity modification condition of the set of touch sensitivity modification conditions is met, wherein at least a first touch sensitivity modification condition indicates that a sensitivity of the device is increased such that an input pressure required to execute a touch action on the device is decreased in response to observing a first context of the user, wherein at least a second touch sensitivity modification condition indicates that the sensitivity of the device is decreased such that the input pressure required to execute the touch action on the device is increased in response to observing a second context of the user; and
   modifying, in response to determining that the touch sensitivity modification condition is met, a touch sensitivity of the device of the user.

2. The method of claim 1, wherein the touch sensitivity modification condition specifies that sensitivity of the device is modified in response to the user being in a first physical activity state.

3. The method of claim 1, wherein the touch sensitivity modification condition specifies that sensitivity of the device is modified in response to the user being in a first temperature.

4. The method of claim 1, wherein the touch sensitivity modification condition specifies that sensitivity of the device is modified in response to a heart rate of the user exceeding a heart rate threshold.

5. The method of claim 1, wherein modifying the touch sensitivity of the device of the user is completed for a predetermined time period in response to determining that the touch sensitivity modification condition is met.

6. The method of claim 5, further comprising:
   receiving a second touch interaction within the predetermined time period;
   not analyzing the second touch interaction to determine whether the touch sensitivity modification condition is met based on the second touch interaction being received within the predetermined time period.

7. A system comprising:
   one or more processors; and
   one or more computer-readable storage media storing program instructions which, when executed by the one or more processors, are configured to cause the one or more processors to perform a method comprising:
   receiving a set of touch history data, wherein the set of touch history data indicates a set of unintended touch interactions mapped to contextual data in which each unintended touch interaction occurs;
   determining, based on an analysis of the set of touch history data, a set of touch sensitivity modification conditions, the set of touch sensitivity modification conditions specifying particular touch sensitivity modifications to be made under particular contextual conditions, wherein the set of touch sensitivity modification conditions are determined using a machine learning algorithm based on the set of touch history data;

receiving a current touch interaction from a device of a user;

analyzing, during a buffering period after receiving the current touch interaction from the device of the user and before executing a touch action corresponding to the current touch interaction, the current touch interaction to determine whether a touch sensitivity modification condition of the set of touch sensitivity modification conditions is met, wherein at least a first touch sensitivity modification condition indicates that a sensitivity of the device is increased such that an input pressure required to execute a touch action on the device is decreased in response to observing a first context of the user, wherein at least a second touch sensitivity modification condition indicates that the sensitivity of the device is decreased such that the input pressure required to execute the touch action on the device is increased in response to observing a second context of the user; and modifying, in response to determining that the touch sensitivity modification condition is met, a touch sensitivity of the device of the user.

8. The system of claim 7, wherein the touch sensitivity modification condition specifies that sensitivity of the device is modified in response to the user being in a first physical activity state.

9. The system of claim 7, wherein the touch sensitivity modification condition specifies that sensitivity of the device is modified in response to the user being in a first temperature.

10. The system of claim 7, wherein the touch sensitivity modification condition specifies that sensitivity of the device is modified in response to a current time being within a time range.

11. A computer program product comprising one or more computer readable storage media, and program instructions collectively stored on the one or more computer readable storage media, the program instructions comprising instructions configured to cause one or more processors to perform a method comprising:

receiving a set of touch history data, wherein the set of touch history data indicates a set of unintended touch interactions mapped to contextual data in which each unintended touch interaction occurs;

determining, based on an analysis of the set of touch history data, a set of touch sensitivity modification conditions, the set of touch sensitivity modification conditions specifying particular touch sensitivity modifications to be made under particular contextual conditions, wherein the set of touch sensitivity modification conditions are determined using a machine learning algorithm based on the set of touch history data;

receiving a current touch interaction from a device of a user;

analyzing, during a buffering period after receiving the current touch interaction from the device of the user and before executing a touch action corresponding to the current touch interaction, the current touch interaction to determine whether a touch sensitivity modification condition of the set of touch sensitivity modification conditions is met, wherein at least a first touch sensitivity modification condition indicates that a sensitivity of the device is increased such that an input pressure required to execute a touch action on the device is decreased in response to observing a first context of the user, wherein at least a second touch sensitivity modification condition indicates that the sensitivity of the device is decreased such that the input pressure required to execute the touch action on the device is increased in response to observing a second context of the user; and modifying, in response to determining that the touch sensitivity modification condition is met, a touch sensitivity of the device of the user.

12. The computer program product of claim 11, wherein the touch sensitivity modification condition specifies that sensitivity of the device is modified in response to the user being in a first physical activity state.

13. The computer program product of claim 11, wherein the touch sensitivity modification condition specifies that sensitivity of the device is modified in response to a brightness in an environment of the user exceeding a brightness threshold.

14. The computer program product of claim 11, wherein the machine learning algorithm is a neural network.

* * * * *